United States Patent
Pierce

(10) Patent No.: US 8,180,320 B2
(45) Date of Patent: May 15, 2012

(54) SYSTEM AND METHOD FOR EFFECTING SPECIAL NUMBER COMMUNICATIONS BY A MULTI-MODE PHONE USING A PREFERRED MODE

(75) Inventor: Jennifer Ann Pierce, Algonquin, IL (US)

(73) Assignee: West Corporation, Omaha, NE (US)

( * ) Notice: Subject to any disclaimer, the term of this patent is extended or adjusted under 35 U.S.C. 154(b) by 375 days.

(21) Appl. No.: 12/501,573

(22) Filed: Jul. 13, 2009

(65) Prior Publication Data

US 2011/0009088 A1 Jan. 13, 2011

(51) Int. Cl.
*H04M 11/04* (2006.01)
(52) U.S. Cl. ............... 455/404.2; 455/404.1; 455/456.1; 455/456.3; 455/552.1; 379/45; 379/219
(58) Field of Classification Search .... 455/404.1–404.2, 455/456.1–456.3, 552.1; 379/45, 219
See application file for complete search history.

(56) References Cited

U.S. PATENT DOCUMENTS

| | | | |
|---|---|---|---|
| 6,240,285 B1 * | 5/2001 | Blum et al. | 455/404.1 |
| 6,405,033 B1 | 6/2002 | Kennedy, III et al. | |
| 6,456,858 B1 * | 9/2002 | Streter | 455/552.1 |
| 7,068,771 B2 | 6/2006 | Plunkett et al. | |
| 7,184,768 B2 | 2/2007 | Hind et al. | |
| 7,295,665 B2 | 11/2007 | Plunkett et al. | |
| 7,389,109 B2 | 6/2008 | Hind et al. | |
| 7,394,761 B2 | 7/2008 | Foster et al. | |
| 7,529,351 B2 | 5/2009 | Binning | |
| 7,539,730 B2 | 5/2009 | Adams et al. | |
| 2004/0218609 A1 * | 11/2004 | Foster et al. | 370/401 |
| 2005/0282579 A1 * | 12/2005 | Kim | 455/552.1 |
| 2007/0218940 A1 * | 9/2007 | Lin | 455/552.1 |
| 2008/0232574 A1 | 9/2008 | Baluja et al. | |
| 2009/0111510 A1 * | 4/2009 | Ono | 455/552.1 |
| 2009/0186596 A1 * | 7/2009 | Kaltsukis | 455/404.2 |

* cited by examiner

*Primary Examiner* — Kathy Wang-Hurst

(57) ABSTRACT

A method for effecting emergency service communications using a preferred mode by a communication station configured for communicating using multiple modes includes: (a) evaluating the multiple modes to identify a plurality of extant operationally viable modes for the communication station; (b) evaluating the plurality of extant operationally viable modes to identify the preferred mode among the plurality of extant operationally viable modes; the preferred mode having a generally best communicating milieu among the plurality of extant operationally viable modes; and (c) initiating the emergency service communications employing the preferred mode.

9 Claims, 4 Drawing Sheets

SYSTEM AND METHOD FOR EFFECTING SPECIAL NUMBER COMMUNICATIONS BY A MULTI-MODE PHONE USING A PREFERRED MODE

FIELD OF THE INVENTION

The present invention is directed to telecommunication methods and systems and especially to methods and systems for effecting special number communications using a preferred mode by a communication station configured for communicating using multiple modes.

BACKGROUND OF THE INVENTION

Examples of such special number calls are 9-1-1 calls for seeking emergency services and other abbreviated number calls for non-emergency special services, such as "N-1-1" systems. Examples of such N-1-1 systems include "3-1-1" (urgent but not emergency calls) and "5-1-1" (traffic inquiry calls). Special number calls may also include, by way of further example and not by way of limitation, abbreviated numbers for calling commercial services, such as "*820" (calling a radio station) or "GOTIX" (calling for tickets).

For purposes of illustration, by way of example and not by way of limitation, the present invention will generally be described in the context of an emergency service network in the United States, commonly referred to as a 9-1-1 network. The teachings of the present invention are equally applicable, useful and novel in other special number calling systems, such as maintenance service networks, college campus security networks, abbreviated number networks for calling commercial services and other networks.

A communication unit or station may be configured to accommodate and utilize multiple modes of operation, sometimes referred to as a multi-mode phone. A multi-mode phone may be configured to operate in either a land-line mode or a mobile mode. A mobile-capable phone may be configured as a multiple-mode capable mobile station, also sometimes referred to as a multi-mode mobile phone. By way of example and not by way of limitation, multi-mode mobile phone may be configured as a mobile telephone, a smart phone, a Personal Digital Assistant (PDA), an Automatic Crash Notification (ACN) unit or another mobile wireless communication device.

By way of further example and not by way of limitation, a multi-mode mobile phone may implement two or more communicating standards or protocols: Radio Access Network (RAN) implementing various technologies, for example Code Division Multiple Access (CDMA), Time Division Multiple Access (TDMA), Group Speciale Mobile (GSM; also referred to as Global System for Mobile communications), Personal Communications System (PCS), Long Term Evolution (LTE), Universal Mobile Telecommunications System (UMTS) or other technologies.

Additional communicating standards or protocols may further include, for example, Unlicensed Mobile Access (UMA), Voice over Internet Protocol (VoIP). Communicating standards or protocols available to multi-mode mobile phones may further include, by way of example and not by way of limitation, non-voice or data protocols such as Short Message Service (SMS).

Different communicating standards or protocols may yield different qualities of communication links under different circumstances such as, by way of example and not by way of limitation, different geographic locations, different deployment patterns of supporting infrastructure relating to particular standards or protocols or other circumstances.

By way of still further example and not by way of limitation, a multi-mode mobile phone may also support multiple carriers. Different carriers may offer similar or different communication standards or protocols within the same geographic area and may yield different results.

It would be useful to be able to identify which carrier, standard or protocol that is supported by a particular multi-mode phone may yield a best or most reliable communication link or location information to support a particular special number call.

There is a need for a system and method for effecting special number communications by a multi-mode phone using a preferred mode.

SUMMARY OF THE INVENTION

A method for effecting emergency service communications using a preferred mode by a communication station configured for communicating using multiple modes includes: (a) evaluating the multiple modes to identify a plurality of extant operationally viable modes for the communication station; (b) evaluating the plurality of extant operationally viable modes to identify the preferred mode among the plurality of extant operationally viable modes; the preferred mode having a generally best communicating milieu among the plurality of extant operationally viable modes; and (c) initiating the emergency service communications employing the preferred mode.

A system for effecting emergency service communications using a preferred mode by a communication station configured for communicating using multiple modes includes: (a) a first mode evaluating unit coupled with the communication station for evaluating the multiple modes to identify a plurality of extant operationally viable modes for the communication station; and (b) a second mode evaluating unit coupled with the communication station for evaluating the plurality of extant operationally viable modes to identify the preferred mode among the plurality of extant operationally viable modes; the preferred mode having a generally best communicating milieu among the plurality of extant operationally viable modes; the emergency service communications being effected employing the preferred mode.

It is, therefore a feature of the present invention to provide a system and method for effecting special number communications by a multi-mode phone using a preferred mode.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as an E9-1-1 network. The teachings of the present invention are equally applicable, useful and novel in other special number calling systems, such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
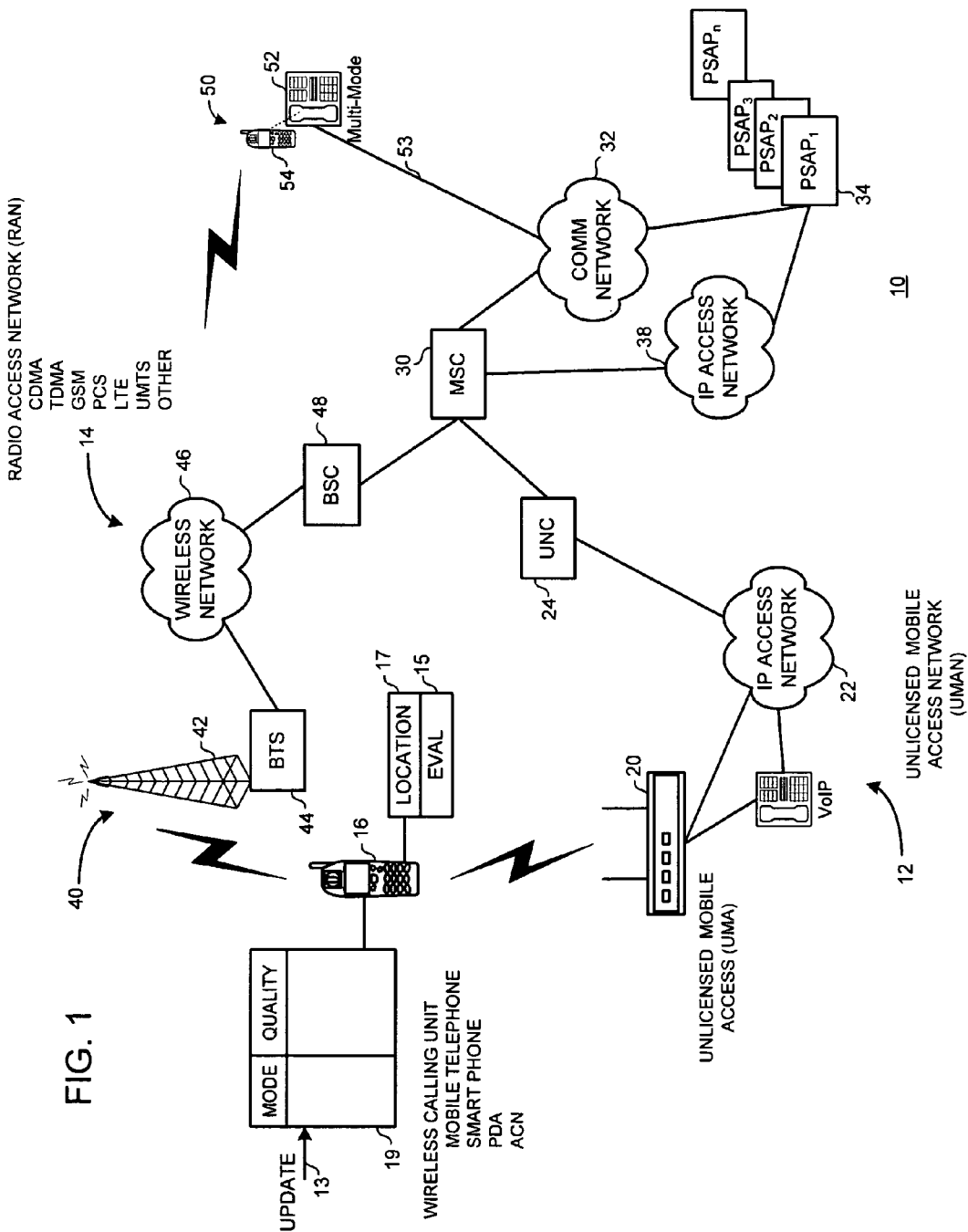
FIG. 1 is a schematic illustration of a system for effecting the present invention.

FIG. 1 is a schematic illustration of a system for effecting the present invention. In FIG. 1, a telecommunication system 10 includes an Unlicensed Mobile Access (UMA) Network (UMAN) 12 and a Radio Access Network (RAN) 14. UMAN 12 may be embodied in, by way of example and not by way of limitation, a Wi-Fi network, a Bluetooth network or another type of UMA. UMAN 12 may include a link to a Voice over Internet Protocol (VoIP) phone instrument 21.

RAN 14 may be embodied in, by way of example and not by way of limitation, one or more of a cellular network or a Personal Communication System (PCS) network employing any of several communication protocols including, by way of further example and not by way of limitation, GSM (Group Speciale Mobile; sometimes referred to as Global System for Mobile communications), Long Term Evolution (LTE), Universal Mobile Telecommunications System (UMTS) or another communication protocol. A communication protocol employed by RAN 14 may be one or more of Time Division Multiple Access (TDMA), Code Division Multiple Access (CDMA) or another coding scheme. UMAN 12 and RAN 14 are configured for wireless communication with a wireless calling unit or instrument 16. Wireless calling unit 16 may be embodied in a wireless calling device 16 including, by way of example and not by way of limitation, mobile telephone, Personal Digital Assistant (PDA) devices, "Smart" phones, automatic crash notification (ACN) units, mobile radio devices and similar communication devices.

UMAN 12 includes an access unit 20 coupled with an Internet Protocol (IP) access network 22. Access unit 20 facilitates communication between wireless communicating unit 16 and IP network 22. (VoIP) phone instrument 21 may be coupled between access unit 20 and IP network 22. IP network 22 is coupled with a UMA Network Controller (UNC) 24. UNC 24 is coupled with a Mobile Switching Center (MSC) 30. MSC 30 is coupled with a communication network 32. Communication network 32 is coupled with a PSAP 34. PSAP 34 may be connected with MSC 30 via an IP network 38 to permit communication between PSAP 34 and MSC 30 without involving communication network 32.

RAN 14 includes an access unit 40 that includes a radio antenna embodied in a radio tower 42 and a Base Transceiver Station (BTS) 44 coupled with radio tower 42. BTS 44 is coupled with a private network 46. Private network 46 may be embodied in, by way of example and not by way of limitation, one or more of a cellular network or a Personal Communication System (PCS) network employing any of several communication protocols including, by way of further example and not by way of limitation, GSM (Group Speciale Mobile; sometimes referred to as Global System for Mobile communications), Long Term Evolution (LTE), Universal Mobile Telecommunications System (UMTS) or another communication protocol. A communication protocol employed by RAN 14 may be one or more of Time Division Multiple Access (TDMA), Code Division Multiple Access (CDMA) or another coding scheme. Access unit 40 facilitates communication between wireless communicating unit 16 and private network 46. Private network 46 is coupled with a Base Station Controller (BSC) 48. BSC 48 is coupled with MSC 30.

Calling unit 16 may wirelessly access UMAN 12 to place an emergency 9-1-1 call via access unit 20 to establish communication with PSAP 34 via IP network 22, UNC 24, MSC 30 and one or both of communication network 32 and IP network 38. Calling unit 16 may wirelessly access UMAN 12 to place an emergency 9-1-1 call via access unit 20 to establish communication with PSAP 34 via VoIP phone instrument 21, IP network 22, UNC 24, MSC 30 and one or both of communication network 32 and IP network 38.

Calling unit 16 may instead wirelessly access RAN 14 to place an emergency 9-1-1 call via BTS 44 to establish communication with PSAP 34 via wireless network 46, BSC 48 and MSC 30.

Calling unit 16 is capable of communicating in two or more of multiple modes, by way of example and not by way of limitation, via a communication link such as UMAN 12 or RAN 14. Calling unit 16 may wirelessly access UMAN 12 to place a call via access unit 20 to establish communication via IP network 22 or via VoIP phone instrument 21 and IP network 22.

Calling unit 16 may access RAN 14 to establish communication using any one or more of mode for which calling unit 16 is equipped, such as, by way of example and not by way of limitation, selected of a cellular network or a Personal Communication System (PCS) network employing selected of several communication protocols including, by way of further example and not by way of limitation, GSM (Group Speciale Mobile; sometimes referred to as Global System for Mobile communications), Long Term Evolution (LTE), Universal Mobile Telecommunications System (UMTS) or another communication protocol. Calling unit 6 may be configured for handling telecommunications using selected of Time Division Multiple Access (TDMA), Code Division Multiple Access (CDMA) or another coding scheme. Calling unit 16 may be further configured to communicate using other technologies such as, by way of further example and not by way of limitation, packetized communications such as General Packet Radio Service (GPRS) and text communications using Short Message Service (SMS).

Calling unit 16 may include a location unit 17 for ascertaining location of communication unit 16. Location unit 17 may employ signal strength to ascertain cell sector identification for ascertaining extant location of calling unit 16. Location unit 17 may employ the Global Positioning System (GPS) for ascertaining extant location of calling unit 16. Location unit 17 may employ another locating technology or any combination of cell sector identification, GPS and another locating technology to ascertain extant location of calling unit 16.

Location unit 17 may be configured to employ location information to predict likely communication coverage density by at least one selected mode of communication which calling unit 16 is capable of implementing. By way of example, location unit 17 may be configured for ascertaining whether calling unit 16 is located in a metropolitan area offering substantially total coverage by a plurality of communication modes or technologies, or may be situated in a rural area offering limited coverage by a limited number of communication modes or technologies. Location unit 17 may include a terrain map downloaded to calling unit 16 during power-up of calling unit 16, or downloaded at other events or upon expiration of predetermined time intervals to avail calling unit 16 of up-to-date information relating to location of calling unit 16.

An evaluating unit 15 may be coupled with calling unit 16 for evaluating at least one predetermined parameter to determine a best communicating milieu at the extant location of calling unit 16. By way of example and not by way of limitation, a best communicating milieu may be indicated by a preferred communication mode at the extant location of calling unit 16 that exhibits better wireless signaling characteristics than are exhibited while employing other modes of communication than the preferred mode. By way of further example and not by way of limitation, a best communicating milieu may be indicated by a preferred communication mode at the extant location of calling unit 16 that exhibits more accurate location information relating to calling unit 16 than is exhibited while employing other modes of communication than the preferred mode. Other measures of preferred mode may be employed instead of or in combination with wireless signaling characteristics and accuracy of location information.

Location unit 17 and evaluating unit 15 may be integrally included in a single unit. Location unit 17 and evaluating unit 15 may be integrally included in calling unit 16. Location unit 17 and evaluating unit 15 may be embodied in a plurality of units distributed in various components of telecommunication system 10.

Telecommunication system 10 may further include a special number communication priority list or unit 19 coupled with calling unit 16. Special number communication priority list 19 includes accuracy of location information or another one or more indication of quality of communicating milieu vis-à-vis respective modes of communication of communication of which calling unit 16 is capable of employing. Special number communication priority list 19 may, for example, also include one or more indications relating to a preferred carrier to use at a particular location. Special number communication priority list 19 may be integrally included in calling unit 16, may be included within another component of telecommunication system 10 or embodied in a plurality of units distributed in various components of telecommunication system 10.

Special number communication priority list 19 is provisioned in by at least one of a preprovisioned priority list provided by a manufacturer of calling unit 16, an input by a user of calling unit 16, and an input to calling unit 16 during communication between calling unit 16 and other components of telecommunication system 10. Alternatively, or in addition, updating of special number communication priority list 19 may be effected by a network serving calling unit 16, updating of special number communication priority list 19 may be effected by a third party subscription service (or non-subscription service) coupled with or serving calling unit 16. When a third party service is updating special number communication priority list 19, one factor that may be indicated as affecting quality of emergency calling may be the carrier entity providing the service.

Updating information stored in special number communication priority list 19 may be carried out locally by a service connected directly with calling instrument 16 or may be carried out remotely via a communicate link such as, by way of example and not by way of limitation, UMAN 12 or RAN 14. Updating may be effected using one or more various connection configurations such as, by way of example and not by way of limitation, a wireless connection, a cable connection and an infrared connection. An update port 13 may be provided to facilitate updating special number communication priority list 19. Updating information stored in special number communication priority list 19 is discussed further in connection with FIG. 3.

Telecommunication system 10 may further include a multi-mode phone unit 50. Multi-mode phone unit 50 may include a land-line capable unit 52 and a wireless communication unit 54. When multi-mode phone unit 50 is operating in a land-line mode, multi-mode phone unit 50 employs land-line capable unit 52 to communicate with PSAP 34 via a land line 53 and communication network 32. When multi-mode phone unit 50 is operating in a mobile mode, wireless communication unit 54 wirelessly communicates with PSAP 34 via access unit 40, private network 46, Base Station Controller (BSC) 48 and MSC 30. Wireless communication unit may also communicate with PSAP 34 via access unit 20, IP network 22, UNC 24, MSC 30 and one or both of communication network 32 and IP network 38.

Figure 2:
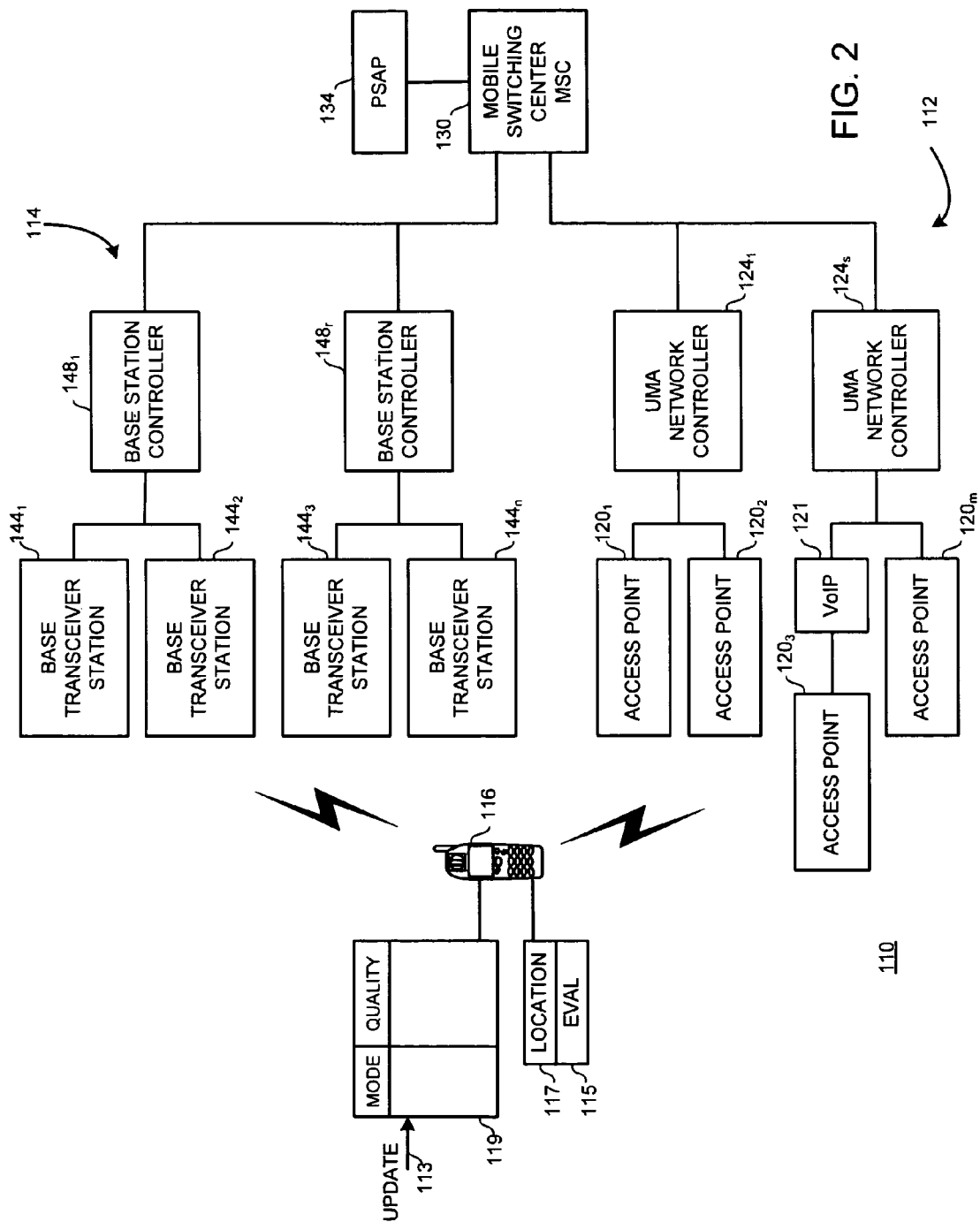
FIG. 2 is a schematic diagram illustrating call routing for a system configured according to the teaching of the present invention deployed in a representative multi-network arrangement.

FIG. 2 is a schematic diagram illustrating call routing for a system configured according to the teaching of the present invention deployed in a representative multi-network arrangement. In FIG. 2, a telecommunication system 110 includes an Unlicensed Mobile Access (UMA) Network (UMAN) 112 and a Radio Access Network (RAN) 114. UMAN 112 may include, by way of example and not by way of limitation, a Wi-Fi network, a Bluetooth network or another type of UMA, generally as described in connection with FIG. 1. RAN 114 may include, by way of example and not by way of limitation, a cellular network or a Personal Communication System (PCS) network employing any of several communication protocols including, by way of further example and not by way of limitation, GSM or another protocol using Time Division Multiple Access (TDMA), Code Division Multiple Access (CDMA) or another coding scheme, generally as described in connection with FIG. 1. UMAN 112 and RAN 114 are configured for wireless communication with a wireless calling unit or instrument 116. Telecommunication system 110 may also include a multi-mode phone unit (not shown in FIG. 2; see multi-mode phone unit 50; FIG. 1) for effecting land-line communications or wireless mobile communications.

UMAN 112 includes access units $120_1$, $120_2$, $120_3$, $120_m$ coupled for call routing via an Internet Protocol (IP) network (not shown in FIG. 2; see IP network 22, FIG. 1). The indicator "m" is employed to signify that there can be any number of access units in telecommunication system 110. The inclusion of four access units $120_1$, $120_2$, $120_3$, $120_m$ in FIG. 2 is illustrative only and does not constitute any limitation regarding the number of access units that may be included in a telecommunication system employing the present invention.

Access units $120_1$, $120_2$, $120_3$, $120_m$ facilitate communication with a wireless communicating unit 116. Calls from access units $120_1$, $120_2$ may be placed with a UMA Network Controller (UNC) $124_1$. Calls from access unit $120_3$ may be placed via VoIP instrument 121 with a UMA Network Controller (UNC) $124_s$. Calls from access unit $120_m$ may be placed with UMA Network Controller (UNC) $124_s$. The indicator "s" is employed to signify that there can be any number of UNCs in telecommunication system 110. The inclusion of two UNCs $124_1$, $124_s$ in FIG. 2 is illustrative only and does not constitute any limitation regarding the number of UNCs that may be included in a telecommunication system employing the present invention. UNCs $124_1$, $124_s$ are coupled with a Mobile Switching Center (MSC) 130. MSC 130 is coupled for call routing with a receiving or called party such as, by way of example and not by way of limitation, PSAP 134 via a communication network (not shown in FIG. 2; see communication network 30, FIG. 1).

RAN 114 includes access units represented in FIG. 2 by Base Transceiver Stations (BTS) $144_1$, $144_2$, $144_3$, $144_n$. The indicator "n" is employed to signify that there can be any number of BTSs in telecommunication system 110. The inclusion of four BTSs $144_1$, $144_2$, $144_3$, $144_n$ in FIG. 2 is illustrative only and does not constitute any limitation regarding the number of BTSs that may be included in a telecommunication system employing the present invention.

BTSs $144_1$, $144_2$, $144_3$, $144_n$ are coupled for call routing with MCS 130 via a private network (not shown in FIG. 2; see private network 46, FIG. 1). BTSs $144_1$, $144_2$, $144_3$, $144_n$ facilitate communication with wireless communicating unit 116. BTSs $144_1$, $144_2$, $144_3$, $144_n$ are coupled with a Base Station Controllers (BSC) $148_1$, $148_r$. Calls from BTSs $144_1$, $144_2$ may be placed with BSC $148_1$. Calls from BTSs $144_3$, $144_n$ may be placed with a BSC $148_r$. The indicator "r" is employed to signify that there can be any number of BSCs in telecommunication system 110. The inclusion of two BSCs $148_1$, $148_r$ in FIG. 2 is illustrative only and does not constitute any limitation regarding the number of BSCs that may be included in a telecommunication system employing the present invention. BSCs $148_1$, $148_r$ are coupled with MSC 130.

Calling unit 116 may wirelessly access UMAN 112 to place an emergency 9-1-1 call via an access unit $120_1$, $120_2$, $120_3$, $120_m$ to establish communication with PSAP 134 via a UNC $124_1$, $124_s$ and MSC 130. Calls placed via access unit $120_3$ may be routed via VoIP instrument 121, as described above.

Calling unit 116 may instead wirelessly access RAN 114 to place an emergency 9-1-1 call via a BTS $144_1$, $144_2$, $144_3$, $144_n$ to establish communication with PSAP 134 via a BSC $148_1$, $148_r$ and MSC 130.

Calling unit 116 may include a location unit 117 for ascertaining location of communication unit 116. Location unit 117 may employ signal strength to ascertain cell sector identification for ascertaining extant location of calling unit 116. Location unit 117 may employ the Global Positioning System (GPS) for ascertaining extant location of calling unit 116. Location unit 117 may employ another locating technology or any combination of cell sector identification, GPS and another locating technology to ascertain extant location of calling unit 116.

Location unit 117 may be configured to employ location information to predict likely communication coverage density by at least one selected mode of communication which calling unit 116 is capable of implementing. By way of example, location unit 117 may be configured for ascertaining whether calling unit 116 is located in a metropolitan area offering substantially total coverage by a plurality of communication modes or technologies, or may be situated in a rural area offering limited coverage by a limited number of communication modes or technologies. Calling unit 116 may contain a representation of a terrain map that may be employed to evaluate the location of calling unit 116 vis-à-vis quality of communication from the location.

An evaluating unit 115 may be coupled with calling unit 116 for evaluating at least one predetermined parameter to determine a best communicating milieu at the extant location of calling unit 116. By way of example and not by way of limitation, a best communicating milieu may be indicated by a preferred communication mode at the extant location of calling unit 116 that exhibits better wireless signaling characteristics than are exhibited while employing other modes of communication than the preferred mode. By way of further example and not by way of limitation, a best communicating milieu may be indicated by a preferred communication mode at the extant location of calling unit 116 that exhibits more accurate location information relating to calling unit 116 than is exhibited while employing other modes of communication than the preferred mode. Other measures of preferred mode may be employed instead of or in combination with wireless signaling characteristics and accuracy of location information.

Location unit 117 and evaluating unit 115 may be integrally included in a single unit. Location unit 117 and evaluating unit 115 may be integrally included in calling unit 116. Location unit 117 and evaluating unit 115 may be embodied in a plurality of units distributed in various components of telecommunication system 110.

Telecommunication system 110 may further include a special number communication priority list or unit 119 coupled with calling unit 116. Special number communication priority list 119 includes accuracy of location information or another one or more indication of quality of communicating milieu vis-à-vis respective modes of communication of communication of which calling unit 116 is capable of employing. Special number communication priority list 119 may be integrally included in calling unit 116, may be included within another component of telecommunication system 110 or embodied in a plurality of units distributed in various components of telecommunication system 110.

Updating information stored in special number communication priority list 119 may include update information provided over a wireless link or user-entered update information. Updating may be carried out locally by a service connected directly with calling instrument 116 or may be carried out remotely via a communication link such as, by way of example and not by way of limitation, UMAN 112 or RAN 114. Updating may be effected using one or more various connection configurations such as, by way of example and not by way of limitation, a wireless connection, a cable connection and an infrared connection. An update port 113 may be provided to facilitate updating special number communication priority list 119.

Figure 3:
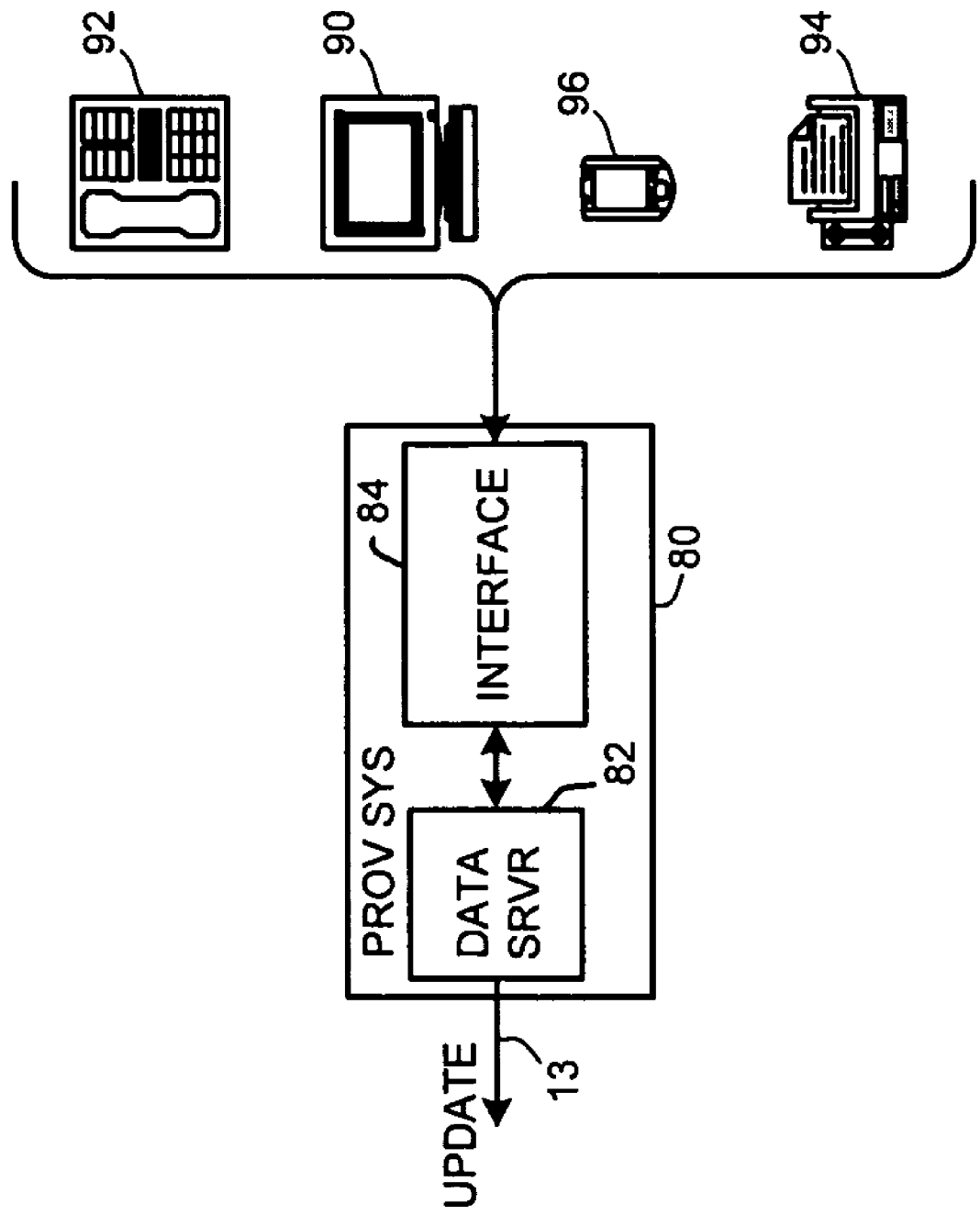
FIG. 3 is a schematic diagram illustrating various ways that the special number communication priority list illustrated in FIG. 1 may be updated.

FIG. 3 is a schematic diagram illustrating various ways that the special number communication priority list illustrated in FIG. 1 may be updated. In FIG. 3, a provisioning system 80 is configured for updating information in special number communication priority list 19 (FIG. 1). Provisioning system 80 includes a data server unit 82 coupled with an interface unit 84.

Provisioning system 80 is coupled with a communications or update port 13 associated with special number communication priority list 19 (FIG. 1). Updates relating to special number communication priority list 19 may be submitted to provisioning system 80 via interface unit 84 by any of various technologies known to those skilled in the art of telecommunication system design including, by way of example and not by way of limitation, a computer 90, a phone 92, a facsimile machine 94 and a PDA (Personal Digital Assistant) 96 or another communication device such as, by way of example and not by way of limitation, a smart phone (not shown in FIG. 3).

Updating via update port 13 may be effected using one or more various connection configurations such as, by way of example and not by way of limitation, a wireless connection, a cable connection and an infrared connection.

Figure 4:
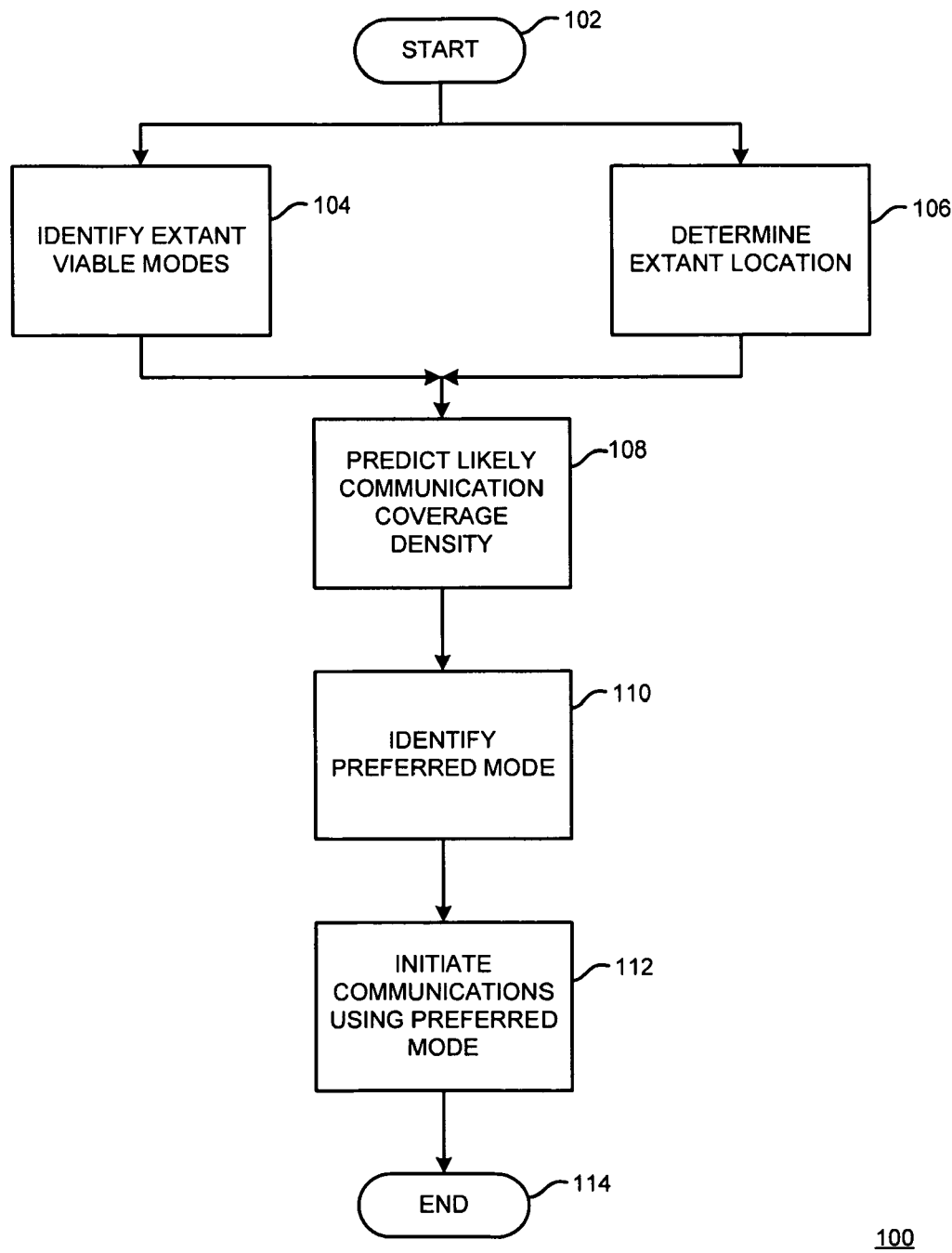
FIG. 4 is a flow diagram illustrating the method of the present invention.

FIG. 4 is a flow diagram illustrating the method of the present invention. In FIG. 4, a method 100 for effecting special number communications using a preferred mode by a multiple-mode capable mobile station begins at a START locus 102. The multiple-mode capable mobile station includes a location determining unit for substantially fixing geographic location of the multiple-mode capable mobile station.

Method 100 continues with, in no particular order: (1) evaluating the multiple modes to identify a plurality of extant operationally viable modes for the multiple-mode capable mobile station, as indicated by a block 104; and (2) determining an extant geographic location of the multiple-mode capable mobile unit, as indicated by a block 106.

Method 100 continues with employing the extant geographic location of the multiple-mode capable mobile unit to effect a prediction of likely communication coverage density, by at least one selected mode of the multiple modes, as indicated by a block 106. The multiple-mode capable mobile unit may predict other elements such as, by way of example and not by way of limitation, accuracy of location technology and type of terrain.

Method 100 continues with evaluating the plurality of extant operationally viable modes and the prediction of likely communication coverage density by the at least one selected mode to identify the preferred mode among the plurality of extant operationally viable modes; the preferred mode having a generally best communicating milieu among the plurality of extant operationally viable modes, as indicated by a block 110. Operationally viable modes are those communication modes that are practicable or workable at the time of the evaluation. A "best" communicating milieu may be a communication milieu exhibiting greatest signal strength, a communication milieu capable of providing the best location information, or "best" may be measured by another quality related parameter related to the extant communications environment.

Method 100 continues with initiating the special number communications employing the preferred mode, as indicated by a block 112.

Method 100 terminates at an END locus 114.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A method for selecting a preferred mode for effecting emergency service communications using a communication device configured for communicating using multiple modes; the method comprising:
  (a) in no particular order:
    (1) evaluating said multiple modes to identify a plurality of extant operationally viable modes for said communication device; and
    (2) determining extant geographic location of said communication device;
  (b) predicting a likely communication coverage density at said extant geographic location by at least one selected mode of said extant operationally viable modes;
  (c) evaluating said at least one selected mode to identify said preferred mode among said at least one selected mode including evaluating communication coverage density from a terrain map relating to said extant geographic location; said terrain map being installed in said communication device by at least one of preprovisioning to said communication device, provisioning at start up of said communication device and periodic provisioning to said communication device; said preferred mode having a generally best communicating milieu among said plurality of extant operationally viable modes; said generally best communicating milieu being capable of a most accurate said determining of extant geographic location of said communication device and having the most predicted communication coverage density; and
  (d) initiating said emergency service communications employing said preferred mode.

2. The selecting a preferred mode for effecting emergency service communications using a communication device configured for communicating using multiple modes as recited in claim 1 wherein said communication station consults an emergency communication priority list in determining said best communicating milieu; said emergency communication priority list indicating accuracy of location information vis-à-vis respective modes of said multiple modes for said extant geographic location.

3. The selecting a preferred mode for effecting emergency service communications using a communication device configured for communicating using multiple modes as recited in claim 2 wherein said emergency communication priority list is provisioned in said communication station by at least one of a preprovisioned said priority list, an input by a user of said communication station, and an input to said communication station during communication between said communication station and a mobile communication network.

4. A method for effecting special number communications using a preferred mode by a multiple-mode capable communication station; said multiple-mode capable communication station including a location determining unit for substantially fixing geographic location of said multiple-mode capable communication station; the method comprising:
  (a) in no particular order:
    (1) evaluating said multiple modes to identify a plurality of extant operationally viable modes for said multiple-mode capable communication station; and
    (2) determining an extant geographic location of said multiple-mode capable communication station;
  (b) employing said extant geographic location of said multiple-mode capable communication station to effect a prediction of likely communication coverage density by at least one selected mode of said multiple modes;

(c) evaluating said prediction of likely communication coverage density by said at least one selected mode to identify said preferred mode among said at least one selected mode including evaluating communication coverage density from a terrain map relating to said extant geographic location; said terrain map being installed in said multiple-mode capable communication station by at least one of preprovisioning to said multiple-mode capable communication station, provisioning at start up of said multiple-mode capable communication station and periodic provisioning to said multiple-mode capable communication station; said preferred mode having a generally best communicating milieu among said plurality of extant operationally viable modes; said generally best communicating milieu being capable of a most accurate said determining of extant geographic location of said multiple mode capable communication station and having the most predicted communication coverage density; and (d) initiating said special number communications employing said preferred mode.

5. The method for effecting special number communications using a preferred mode by a multiple-mode capable communication station as recited in claim 4 wherein said multiple-mode capable communication station consults a special number communication priority list in determining said best communicating milieu; said special number communication priority list indicating accuracy of location information vis-à-vis respective modes of said multiple modes for said extant geographic location.

6. The method for effecting special number communications using a preferred mode by a multiple-mode capable communication station as recited in claim 5 wherein said special number communication priority list is provisioned in said multiple-mode capable communication station by at least one of a preprovisioned said priority list, an input by a user of said multiple-mode capable communication station, and an input to said multiple-mode capable communication station during communication between said multiple-mode capable communication station and a mobile communication network.

7. A system for effecting emergency service communications using a preferred mode by a communication station configured for communicating using multiple modes; the system comprising:

(a) a location determining unit coupled with said communication station for substantially fixing geographic location of said communication station, said location determining unit determining an extant geographic location of said communication station; said extant geographic location of said communication station being employed to effect a prediction of likely communication coverage density by at least one selected mode of said multiple modes; and (b) a mode evaluating unit coupled with said communication station for evaluating said at least one selected mode to identify said preferred mode among said at least one selected mode including evaluating communication coverage density from a terrain map relating to said extant geographic location; said terrain map being installed in said communication station by at least one of preprovisioning to said communication station, provisioning at start up of said communication station and periodic provisioning to said communication station; said preferred mode having a generally best communicating milieu among said plurality of extant operationally viable modes; said generally best communicating milieu being capable of a most accurate said determining of extant geographic location of said multiple mode capable communication station and having the most predicted communication coverage density;

said emergency service communications being effected employing said preferred mode.

8. The system for effecting emergency service communications using a preferred mode by a communication station configured for communicating using multiple modes as recited in claim 7 wherein said communication station consults an emergency communication priority list in determining said best communicating milieu; said emergency communication priority list indicating accuracy of location information vis-à-vis respective modes of said multiple modes for said extant geographic location.

9. The system for effecting emergency service communications using a preferred mode by a communication station configured for communicating using multiple modes as recited in claim 8 wherein said emergency communication priority list is provisioned in said communication station by at least one of a preprovisioned said priority list, an input by a user of said communication station, and an input to said communication station during communication between said communication station and a mobile communication network.

* * * * *